(12) United States Patent
Tobita

(10) Patent No.: US 7,035,120 B2
(45) Date of Patent: Apr. 25, 2006

(54) DRIVING CIRCUIT EMPLOYING SYNCHRONOUS RECTIFIER CIRCUIT

(75) Inventor: Atsuhiro Tobita, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 168 days.

(21) Appl. No.: 10/443,084

(22) Filed: May 22, 2003

(65) Prior Publication Data

US 2005/0047177 A1 Mar. 3, 2005

(30) Foreign Application Priority Data

Jun. 5, 2002 (JP) ............................. 2002-164043

(51) Int. Cl.
*H02M 3/335* (2006.01)

(52) U.S. Cl. ............................. 363/21.06; 363/21.14; 363/127

(58) Field of Classification Search ............ 363/21.06, 363/21.14, 97, 127
See application file for complete search history.

(56) References Cited

U.S. PATENT DOCUMENTS

| | | | |
|---|---|---|---|
| 3,708,743 A | 1/1973 | Grangaard et al. | 323/22 SC |
| 4,087,703 A | 5/1978 | Akamatsu | 307/253 |
| 4,335,334 A | 6/1982 | Hosoya | 315/408 |
| 5,144,547 A * | 9/1992 | Masamoto | 363/127 |
| 5,313,109 A | 5/1994 | Smith | 307/270 |
| 5,343,383 A * | 8/1994 | Shinada et al. | 363/127 |
| 5,663,877 A | 9/1997 | Dittli et al. | |
| 5,708,571 A | 1/1998 | Shinada | 363/16 |
| 5,870,299 A | 2/1999 | Rozman | |
| 6,011,703 A | 1/2000 | Boylan et al. | 363/21 |
| 6,038,143 A | 3/2000 | Miyazaki et al. | 363/19 |
| 6,108,219 A | 8/2000 | French | 363/23 |
| 6,137,695 A | 10/2000 | Takida et al. | 363/19 |
| 6,191,965 B1 | 2/2001 | Matsumoto | |
| 6,288,919 B1 * | 9/2001 | Jain | 363/89 |
| 6,288,920 B1 | 9/2001 | Jacobs et al. | |
| 6,351,403 B1 * | 2/2002 | Abdoulin | 363/127 |
| 6,377,477 B1 | 4/2002 | Xie et al. | 363/21.14 |
| 6,504,270 B1 | 1/2003 | Matsushita | 307/140 |
| 6,529,390 B1 * | 3/2003 | Takahashi | 363/21.14 |
| 6,608,769 B1 | 8/2003 | Bergk | 363/21.17 |
| 2002/0057586 A1 | 5/2002 | Takahashi | |
| 2003/0210118 A1 | 11/2003 | Tobita | 336/173 |
| 2004/0022076 A1 | 2/2004 | Tobita | 363/21.06 |

FOREIGN PATENT DOCUMENTS

DE 37 27 170 A1 2/1989

(Continued)

*Primary Examiner*—Gary L Laxton
(74) *Attorney, Agent, or Firm*—Nixon & Vanderhye, PC

(57) ABSTRACT

An example synchronous rectifier circuit includes a transformer having a primary winding and a secondary winding which are insulated from each other; a main switch provided at a primary side of the circuit, which includes the primary winding; a rectifying FET provided at a secondary side of the circuit, which includes the secondary winding; a commutating FET provided at the secondary side of the circuit; and an auxiliary FET provided between a gate and a source of the rectifying FET. The auxiliary FET has a threshold lower than a threshold of the commutating FET and a gate of the auxiliary FET is connected to a gate of the commutating FET, and a short circuit is produced between the gate and the source of the rectifying FET while the commutating FET is in an on-state.

17 Claims, 2 Drawing Sheets

FOREIGN PATENT DOCUMENTS

| | | |
|---|---|---|
| EP | 1 231 705 A2 | 8/2002 |
| JP | 06098540 | 4/1994 |
| JP | 9098569 | 4/1997 |
| JP | 10-136646 | 5/1998 |
| JP | 10-146054 | 5/1998 |
| JP | 11-069803 | 3/1999 |
| JP | HEI 11-187653 | 7/1999 |
| JP | 11-262261 | 9/1999 |
| JP | HEI 2000-184705 | 6/2000 |
| JP | 2001-204171 | 7/2001 |
| JP | 2002-51558 | 2/2002 |
| SU | 1762374 A1 | 9/1992 |

\* cited by examiner

DRIVING CIRCUIT EMPLOYING SYNCHRONOUS RECTIFIER CIRCUIT

BACKGROUND OF THE INVENTION

1. Field of the Invention

The present invention relates to a driving circuit employing a synchronous rectifier circuit in which the primary winding side and the secondary winding side of a transformer are insulated from each other.

2. Description of the Related Art

FIG. 2 shows a conventional synchronous rectifier circuit of a forward converter. In the figure, reference numeral 1 indicates a transformer, reference numeral 2 indicates a main switch, reference numeral 3 indicates a rectifying FET (field effect transistor), reference numeral 4 indicates a commutating FET, reference numerals 5 and 6 indicate drive resistors, reference numeral 7 indicates an output choke (coil), and reference numeral 8 indicates a smoothing capacitor.

In this circuit, (i) a series circuit consisting of the input source and the main switch 2 is connected to the primary winding of the transformer 1, (ii) a series circuit consisting of the output choke 7 and the load is connected to the commutating FET 4 in parallel, (iii) an end of the commutating FET 4 is connected to an end of the secondary winding of the transformer 1 in series, and the other end of the commutating FET 4 is connected to the other end of the secondary winding via the rectifying FET 3, (iv) the gate of the rectifying FET 3 is connected to the drive resistor 5, which is connected to a connecting point provided between the secondary winding and the output choke 7, (v) the gate of the commutating FET 4 is connected to the drive resistor 6, which is connected to the other end of the secondary winding of the transformer 1, and (vi) the smoothing capacitor 8 is connected to the load in parallel.

The operation of the synchronous rectifier circuit having the above-explained structure will be explained below. When the main switch 2 is turned off, a voltage is generated between the drain and the source of the main switch 2, thereby inverting the voltage of the secondary winding. In this process, the induced voltage at the secondary winding is applied via the drive resistor 6 to the commutating FET 4, thereby turning on the commutating FET 4.

In this synchronous rectifier circuit, if voltage remains at the output of the secondary (winding) side when the driving pulse stops at the primary (winding) side, then a voltage is generated between the drain and the source of the commutating FET 4, and simultaneously, a voltage is also applied to the gate of the rectifying FET 3. Accordingly, a reverse current starts to flow from the output choke 7 via the transformer 1 and the rectifying FET 3, and the voltage generated by this reverse current and the excitation of the output choke 7 may damage elements in the circuit.

In order to solve the above problem, as shown in FIG. 3, a diode 14 is inserted between the gate and the source of the rectifying FET 3 and a capacitor 10 is connected to the gate of the rectifying FET 3, so as to simply divide the output of the transformer. Such a driving method is generally used. However, in this method, when the primary side is stopped and the commutating FET 4 is shifted from the ON to the OFF state (i.e., turned off from the ON state), a voltage is generated between the terminals of the output choke which is excited by the current drawn from the output side of the synchronous rectifier circuit, and simultaneously, a voltage is generated between the primary and secondary windings of the transformer 1. The rectifying FET 3 turns on immediately after the voltage is generated between the primary and secondary windings, so that the reverse current is easily produced.

SUMMARY OF THE INVENTION

In consideration of the above circumstances, an object of the present invention is to provide a driving circuit using a novel synchronous rectifier circuit in which reverse current is difficult to produce.

Therefore, the present invention provides a driving circuit employing a synchronous rectifier circuit comprising:

a transformer having a primary winding and a secondary winding which are insulated with each other;

a main switch provided at a primary side of the circuit, which includes the primary winding of the transformer;

a rectifying FET provided at a secondary side of the circuit, which includes the secondary winding of the transformer;

a commutating FET provided at the secondary side of the circuit; and a first auxiliary FET provided between a gate and a source of the rectifying FET, wherein the first auxiliary FET has a threshold lower than a threshold of the commutating FET and a gate of the auxiliary FET is connected to a gate of the commutating FET, wherein a short circuit is produced between the gate and the source of the rectifying FET while the commutating FET is in an on-state.

In a typical example, the driving circuit further comprises a capacitor, an electrode of which is connected to the gate of the rectifying FET, and the other electrode of the capacitor being connected to the secondary winding of the transformer.

In another typical example, the driving circuit further comprises a diode connected to the commutating FET in a manner such that the gate of the commutating FET is connected to a cathode of the diode.

In another typical example, the driving circuit further comprises a second auxiliary FET provided between the gate and a source of the commutating FET and driven in synchronism with the main switch, wherein a drain and a source of the second auxiliary FET are respectively connected to the gate and the source of the commutating FET.

In this case, the driving circuit may further comprise a resistor for discharging electric charge on the gates of the commutating FET and the first auxiliary FET which are connected with each other, the resistor being connected to the second auxiliary FET in parallel between the source and the drain of the second auxiliary FET.

According to the present invention which employs a (first) auxiliary FET between the gate and the source of the rectifying FET, the rectifying FET can be reliably turned off while the commutating FET is in the on-state. In addition, the threshold of this auxiliary FET is lower than that of the commutating FET, and the gate of this auxiliary FET is connected to the gate of the commutating FET. Therefore, after the switching operation of the primary side of the circuit stops, even when the commutating FET is shifted from the on-state to the off-state due to discharge of electric charge on the gates and an electric potential is generated between the windings of the transformer, the gate of the rectifying FET can be in the off-state (i.e., the gate-off period of the rectifying FET can be elongated), so that reverse current is difficult to produce.

DESCRIPTION OF THE PREFERRED EMBODIMENTS

Hereinafter, embodiments according to the present invention will be explained with reference to the drawings.

Figure 1:
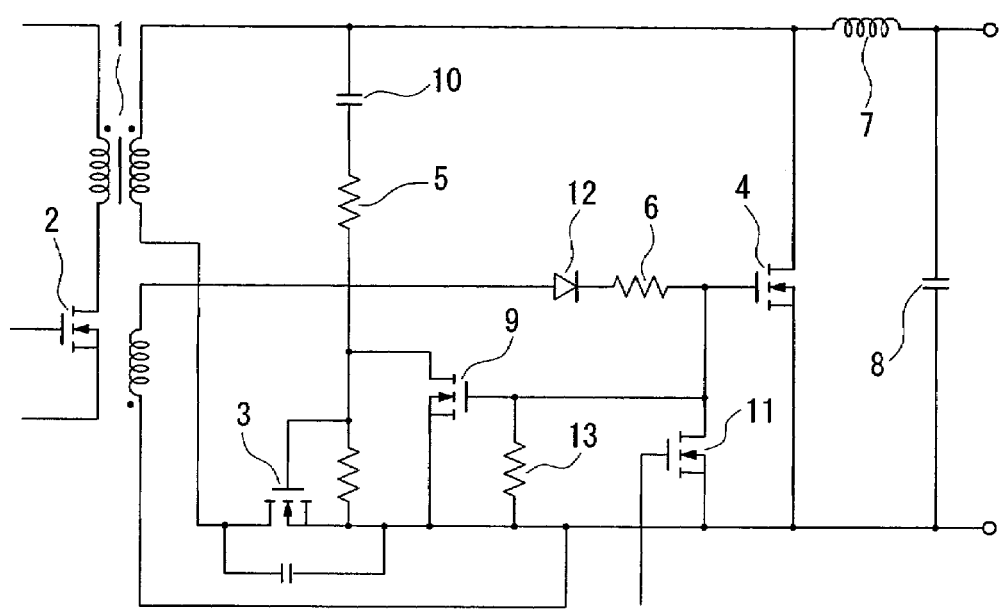
FIG. 1 is a circuit diagram showing an embodiment of a driving circuit using a synchronous rectifier circuit according to the present invention.
Figure 2:
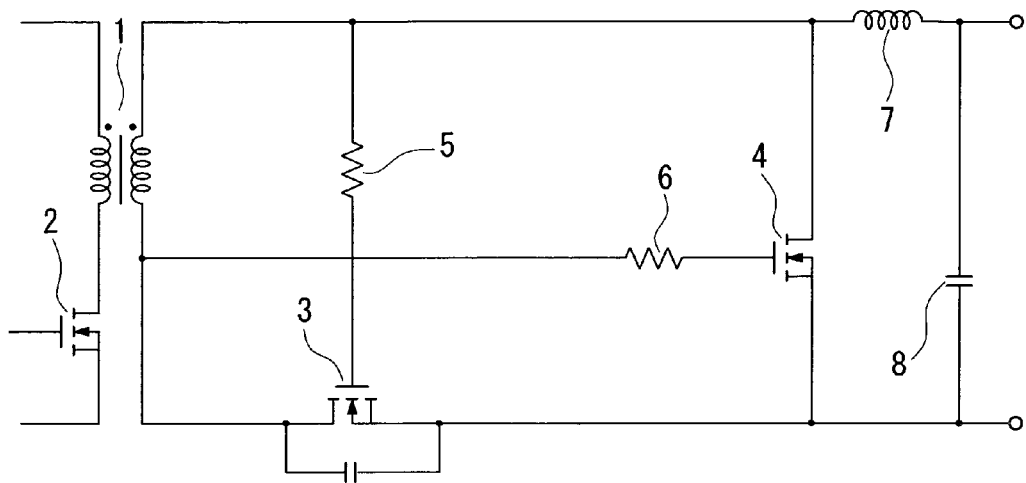
FIG. 2 is a circuit diagram showing a conventional synchronous rectifier circuit.
Figure 3:
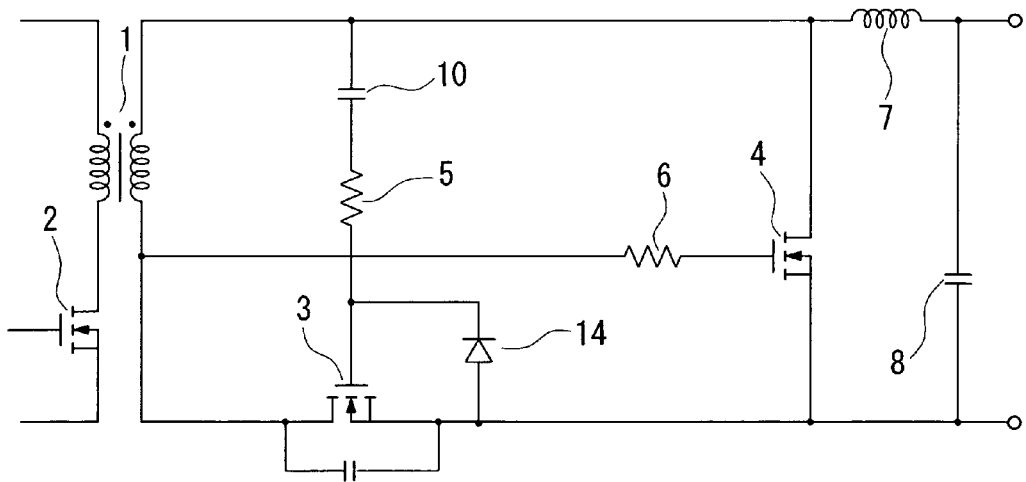
FIG. 3 is a circuit diagram showing another conventional synchronous rectifier circuit.

FIG. 1 is a diagram showing an embodiment of a driving circuit using (i.e., employing) a synchronous rectifier circuit according to the present invention.

In FIG. 1, reference numeral 1 indicates a transformer, reference numeral 2 indicates a main switch, reference numeral 3 indicates a rectifying FET (field effect transistor), reference numeral 4 indicates a commutating FET, reference numerals 5 and 6 indicate drive resistors, reference numeral 7 indicates an output choke (coil), reference numeral 8 indicates a smoothing capacitor, reference numeral 9 indicates a first auxiliary FET, reference numeral 10 indicates a capacitor, reference numeral 11 indicates a second auxiliary FET, reference numeral 12 indicates a diode, and reference numeral 13 indicates a resistor for discharge.

In this driving circuit using a synchronous rectifier circuit, (i) a series circuit consisting of the input source and the main switch 2 is connected to the primary winding, (ii) a series circuit consisting of the output choke 7 and the load is connected to the commutating FET 4 in parallel, (iii) an end of the commutating FET 4 is connected to an end of the secondary winding in series, and the other end of the commutating FET 4 is connected to the other end of the secondary winding via the rectifying FET 3, (iv) the gate of the rectifying FET 3 is connected to the drive resistor 5, which is connected to a connecting point provided between the secondary winding and the output choke 7, (v) the gate of the commutating FET 4 is connected to the drive resistor 6, which is connected to the other end of the secondary winding of the transformer 1, and (vi) the smoothing capacitor 8 is connected to the load in parallel.

Also in this driving circuit using a synchronous rectifier circuit, the first auxiliary FET 9 is provided between the gate and the source of the rectifying FET 3, and the gate of the auxiliary FET 9 and the gate of the commutating FET 4 are connected with each other, thereby producing a short circuit between the gate and the source of the rectifying FET 3 while the commutating FET 4 is in the ON state. Also in this embodiment, the gate of the rectifying FET 3 is connected to one of the electrodes of the capacitor 10, and the other electrode of the capacitor 10 is connected to the secondary winding of the transformer 1. In addition, the diode 12 is connected via the resistor 6 to the commutating FET 4 in a manner such that the cathode of the diode 12 faces the gate of the commutating FET 4.

Also in this driving circuit, the second auxiliary FET 11 is provided between the gate and the source of the commutating FET 4, where the second auxiliary FET 11 is in synchronism with the main switch 2. The drain and the source of this second auxiliary FET 11 are respectively connected to the gate and the source of the commutating FET 4. In addition, the ends of the resistor 13 for discharge are each connected to the source and the drain of the second auxiliary FET 11, that is, the resistor 13 is connected to the second auxiliary FET 11 in parallel.

The operation of the driving circuit of the present embodiment having the above-explained structure will be explained below.

While the main switch 2 at the primary (winding) side is in the ON state, the rectifying FET 3 at the secondary (winding) side is turned off, thereby supplying current to the load. In addition, when the main switch 2 is turned off, a flyback voltage of the transformer 1 is produced at the tertiary winding which is connected to a portion between the gate and the source of the commutating FET 4. Accordingly, electric charge is applied via the diode 12 to the gate of the commutating FET 4, so that the commutating FET 4 is turned on. Simultaneously, the electric potential of an end of the capacitor 10, which is connected to the secondary winding side of the transformer 1, drops to the potential level of the sources of the rectifying FET 3 and the commutating FET 4 (where the capacitor 10 is also connected to the gate of the rectifying FET 3); thus, the electric potential of the gate of the rectifying FET 3 decreases and the auxiliary FET 9 is simultaneously turned on. Therefore, the electric potential of the gate of the rectifying FET 3 is clamped to the electric potential of the source of the FET 3. That is, while the commutating FET 4 is in the ON state, a short circuit is produced between the gate and the source of the rectifying FET 3.

Next, when the main switch 2 at the primary side is turned on, the second auxiliary FET 11 which is driven in synchronism with the main switch 2 is also turned on, so that the charge on the gate of the commutating FET 4 is discharged, and thus the commutating FET 4 is turned off. Here, the charge on the gate of the first auxiliary FET 9, which is connected to the gate of this commutating FET 4, is also discharged, so that the auxiliary FET 9 is turned off. Therefore, a potential is produced at the gate of the rectifying FET 3, where the potential is determined by dividing the voltage, produced at the secondary winding of the transformer 1, according to the ratio of the input capacitance of the capacitor 10 to the input capacitance of the rectifying FET 3. Accordingly, the rectifying FET 3 is shifted to the ON state.

If the switching operation of the main switch 2 at the primary side stops, and thus the main switch 2 is maintained in the OFF state, the second auxiliary FET 11 is also maintained in the OFF state. Therefore, the charge on the gates of the commutating FET 4 and the first auxiliary FET 9 is discharged by the resistor 13 (for discharge) which is connected to the gates, and the electric potential at the gates gradually decreases. When the decreased electric potential reaches the threshold of the commutating FET 4, the commutating FET 4 starts to shift to the OFF state and the drain voltage of the commutating FET 4 starts to increase. In this process, the auxiliary FET 9, which has a threshold lower than the threshold of the commutating FET 4, is still maintained in the ON state. Therefore, even when a voltage is produced between the drain and the source of the commutating FET 4 and charging of the capacitor 10 starts, the electric potential at the gate of the rectifying FET 3 is clamped to the electric potential of the source by the auxiliary FET 9, so that the rectifying FET 3 is maintained in the OFF state. In addition, even when the auxiliary FET 9 is later turned off after the electric charge is applied to the capacitor 10, no charge is applied to the gate of the rectifying FET 3, so that the rectifying FET 3 is not turned on and thus reverse current is difficult to generate.

What is claimed is:

1. A driving circuit employing a synchronous rectifier circuit comprising:
   a transformer including a primary winding and a secondary winding which are insulated from each other;
   a main switch provided at a primary side of the circuit, which includes the primary winding of the transformer;
   a rectifying FET provided at a secondary side of the circuit, which includes the secondary winding of the transformer;
   a commutating FET provided at the secondary side of the circuit;
   a first auxiliary FET provided between a gate and a source of the rectifying FET, wherein the first auxiliary FET has a threshold voltage lower than a threshold voltage of the commutating FET and a gate of the first auxiliary FET is connected to a gate of the commutating FET; and
   a capacitor including a first electrode connected to the gate of the rectifying FET and a drain of the first auxiliary FET and a second electrode connected to the secondary winding of the transformer,
   wherein a short circuit is produced between the gate and the source of the rectifying FET while the commutating FET is in an on-state.

2. A driving circuit as claimed in claim 1, further comprising:
   a diode connected to the commutating FET in a manner such that the gate of the commutating FET is connected to a cathode of the diode.

3. A driving circuit as claimed in claim 2, further comprising:
   a second auxiliary FET provided between the gate and a source of the commutating FET and driven in synchronism with the main switch, wherein a drain and a source of the second auxiliary FET are respectively connected to the gate and the source of the commutating FET.

4. A driving circuit as claimed in claim 3, further comprising:
   a resistor for discharging electric charge on the gates of the commutating FET and the first auxiliary FET which are connected with each other, the resistor being connected to the second auxiliary FET in parallel between the source and the drain of the second auxiliary FET.

5. A driving circuit as claimed in claim 1, further comprising:
   a second auxiliary FET provided between the gate and a source of the commutating FET and driven in synchronism with the main switch, wherein a drain and a source of the second auxiliary FET are respectively connected to the gate and the source of the commutating FET.

6. A driving circuit as claimed in claim 5, further comprising:
   a resistor for discharging electric charge on the gates of the commutating FET and the first auxiliary FET which are connected with each other, the resistor being connected to the second auxiliary FET in parallel between the source and the drain of the second auxiliary FET.

7. A driving circuit as claimed in claim 1, wherein the transformer further comprises a tertiary winding connected between a gate and a source of the commutating FET.

8. A synchronous rectifier circuit comprising:
   a transformer including a primary winding, and a secondary winding insulated from the primary winding;
   a main switch provided on a primary winding side of the synchronous rectifier circuit;
   a rectifying FET provided on a secondary winding side of the synchronous rectifier circuit and including a gate, a first terminal connected to one side of the secondary winding, and a second terminal;
   a commutating FET provided on the secondary side of the synchronous rectifier circuit and including a gate, a first terminal connected to the other side of the secondary winding, and a second terminal connected to the second terminal of the rectifying FET;
   a first auxiliary FET having a threshold voltage lower than a threshold voltage of the commutating FET, the first auxiliary FET including a gate connected to the gate of the commutating FET, a first terminal connected to the gate of rectifying FET, and a second terminal connected to the second terminal of the rectifying FET; and
   a first capacitor including a first electrode connected to the gate of the rectifying FET and the first terminal of the first auxiliary FET, and a second electrode connected to the other side of the secondary winding,
   wherein a short circuit is produced between the gate and the second terminal of the rectifying FET while the commutating FET is in an on-state.

9. The synchronous rectifier circuit as claimed in claim 8, wherein the first electrode of the capacitor is connected to the gate of the rectifying FET and the first terminal of the first auxiliary FET via a resistor.

10. The synchronous rectifier circuit as claimed in claim 8, wherein the transformer further comprises a tertiary winding connected between the gate and the second terminal of the commutating FET.

11. The synchronous rectifier circuit as claimed in claim 10, further comprising:
    a diode also connected between the gate and the second terminal of the commutating FET.

12. The synchronous rectifier circuit as claimed in claim 10, further comprising:
    a diode and a resistor also connected between the gate and the second terminal of the commutating FET.

13. The synchronous rectifier circuit as claimed in claim 8, further comprising:
    a second auxiliary FET including first and second terminals connected between the gate and the second terminal of the commutating FET.

14. The synchronous rectifier circuit as claimed in claim 13, further comprising:
    a resistor connected in parallel across the first and second terminals of the second auxiliary FET.

15. The synchronous rectifier circuit as claimed in claim 13, wherein the main switch and the second auxiliary FET are driven synchronously.

16. The synchronous rectifier circuit as claimed in claim 8, further comprising:
    a second capacitor connected across the first and second terminals of the rectifying FET.

17. A driving circuit comprising the synchronous rectifier circuit as claimed in claim 8.

* * * * *